US012002260B2

United States Patent
Kim et al.

(10) Patent No.: US 12,002,260 B2
(45) Date of Patent: Jun. 4, 2024

(54) AUTOMATIC TOPOLOGY MAPPING PROCESSING METHOD AND SYSTEM BASED ON OMNIDIRECTIONAL IMAGE INFORMATION

(71) Applicant: 3I INC., Daegu (KR)

(72) Inventors: Gyu Hyon Kim, Seoul (KR); Farkhod Khudayberganov, Seoul (KR)

(73) Assignee: 3I INC., Daegu (KR)

( * ) Notice: Subject to any disclaimer, the term of this patent is extended or adjusted under 35 U.S.C. 154(b) by 47 days.

(21) Appl. No.: 17/429,616

(22) PCT Filed: Jun. 22, 2020

(86) PCT No.: PCT/KR2020/008072
§ 371 (c)(1),
(2) Date: Aug. 26, 2021

(87) PCT Pub. No.: WO2020/256517
PCT Pub. Date: Dec. 24, 2020

(65) Prior Publication Data
US 2022/0139073 A1  May 5, 2022

(30) Foreign Application Priority Data

Jun. 21, 2019 (KR) .................. 10-2019-0074387
Dec. 24, 2019 (KR) .................. 10-2019-0174554

(51) Int. Cl.
*G06V 10/25* (2022.01)
*G06V 10/10* (2022.01)
(Continued)

(52) U.S. Cl.
CPC .............. *G06V 10/82* (2022.01); *G06V 10/16* (2022.01); *G06V 10/25* (2022.01); *G06V 10/469* (2022.01); *G06V 10/7715* (2022.01); *G06V 20/36* (2022.01)

(58) Field of Classification Search
CPC .... G06V 10/82; G06V 10/25; G06V 10/7715; G06V 10/469; G06V 10/16; G06V 20/36
See application file for complete search history.

(56) References Cited

U.S. PATENT DOCUMENTS 10,460,459 B2    10/2019   Bar et al.
2018/0197297 A1*  7/2018   Jia .......................... G06T 7/20
(Continued)

FOREIGN PATENT DOCUMENTS

KR    20180101165    9/2018
KR    101915540      1/2019
KR    101939349      4/2019

OTHER PUBLICATIONS

Ma, Jiayi, and Ji Zhao. "Robust Topological Navigation via Convolutional Neural Network Feature and Sharpness Measure." IEEE Access, vol. 5, 2017, pp. 20707-20715.
(Continued)

Primary Examiner — Syed Haider
(74) Attorney, Agent, or Firm — PnK IP LLC

(57) ABSTRACT

An automatic topology mapping processing method and system. The automatic topology mapping processing method includes the steps of: obtaining, by the automatic topology mapping processing system, a plurality of images, wherein at least two of the plurality of images include a common area in which a common space is captured; extracting, by the automatic topology mapping processing system, from respective images, features of the respective images through a feature extractor using a neural network; and determining, by the automatic topology mapping processing system, mapping images of the respective images on the basis of the features extracted from the respective images.

9 Claims, 10 Drawing Sheets

(51) Int. Cl.
    *G06V 10/46*     (2022.01)
    *G06V 10/77*     (2022.01)
    *G06V 10/82*     (2022.01)
    *G06V 20/00*     (2022.01)

(56) References Cited

U.S. PATENT DOCUMENTS

| | | | |
|---|---|---|---|
| 2018/0268207 A1* | 9/2018 | Kim | G06V 40/176 |
| 2019/0066373 A1* | 2/2019 | Tran | G06V 20/54 |
| 2019/0102528 A1* | 4/2019 | Beacham | G06V 40/171 |
| 2019/0156502 A1* | 5/2019 | Lee | G06T 7/11 |
| 2020/0013154 A1 | 1/2020 | Jang | |
| 2020/0116493 A1* | 4/2020 | Colburn | G06T 7/55 |
| 2020/0202514 A1* | 6/2020 | Yang | G06F 18/21 |

OTHER PUBLICATIONS

Melekhov, Jaroslav, et al. "Siamese Network Features for Image Matching." 2016 23rd International Conference on Pattern Recognition (ICPR), 2016.

International Search Report dated Apr. 7, 2021, in International Application No. PCT/KR2020/008072 (with English Translation).

\* cited by examiner

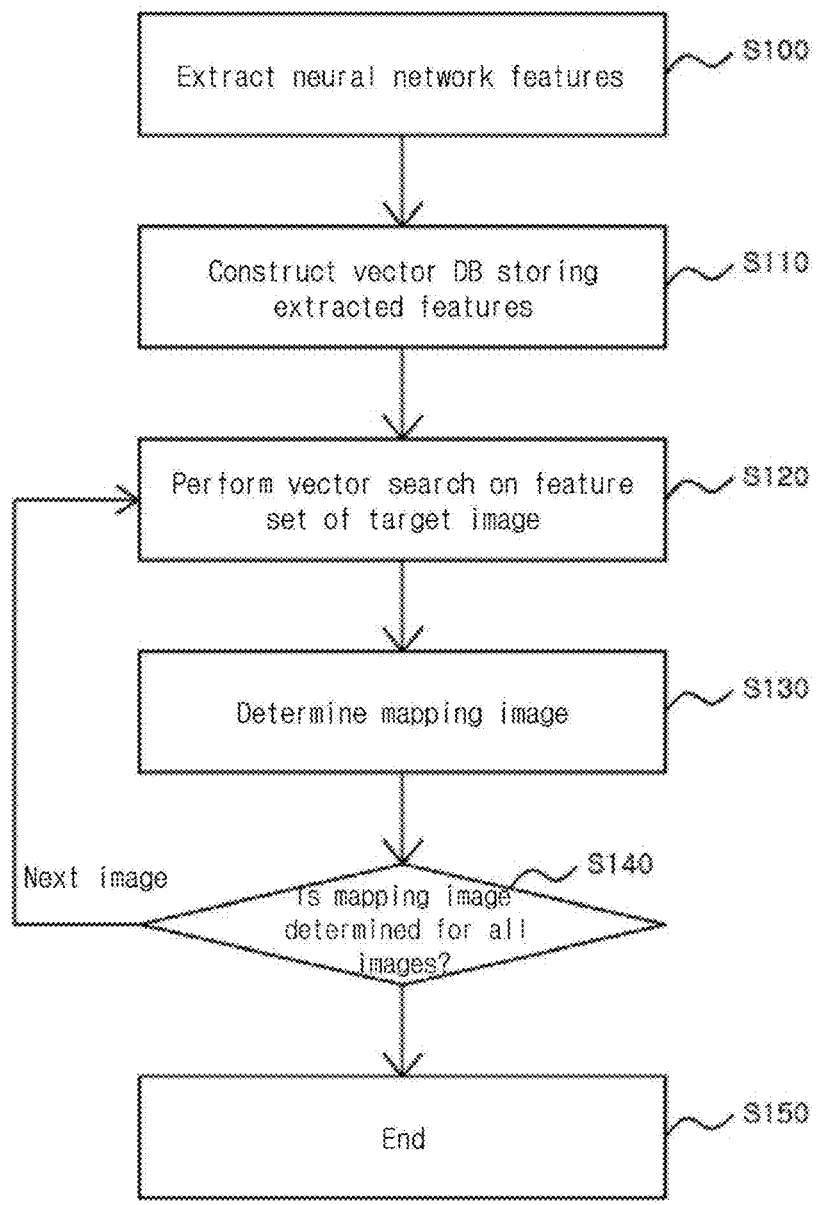

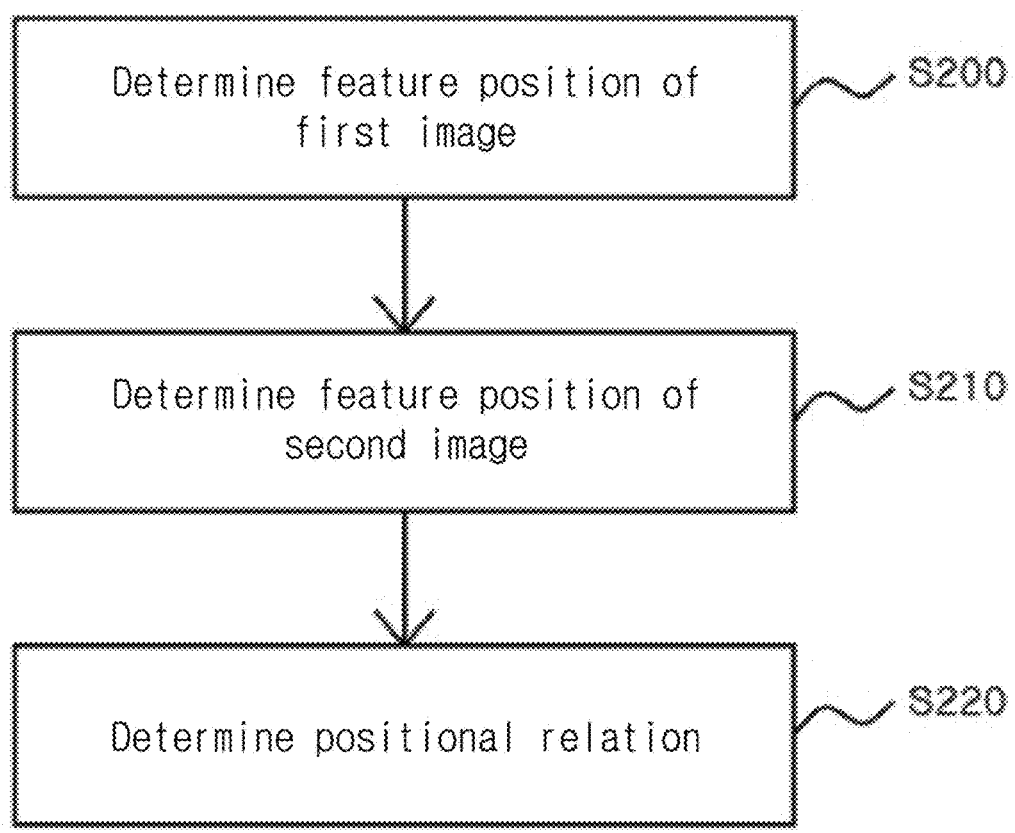

AUTOMATIC TOPOLOGY MAPPING PROCESSING METHOD AND SYSTEM BASED ON OMNIDIRECTIONAL IMAGE INFORMATION

CROSS REFERENCE TO RELATED APPLICATION

This application is a National Stage Entry of International Patent Application No. PCT/KR2020/008072, filed on Jun. 22, 2020, and claims priority from and the benefit of Korean Patent Application No. 10-2020-0074387, filed on Jun. 21, 2019 and Korean Patent Application No. 10-2019-0174554, filed on Dec. 24, 2019, each of which is hereby incorporated by reference for all purposes if fully set forth herein.

BACKGROUND

Field

Exemplary embodiments of the invention relate generally to a method capable of effective mapping or connecting (or matching) of positional relation among a plurality of images photographed at different positions, and a system thereof.

Discussion of the Background

Techniques for topology mapping between different images are widely known. The topology mapping may be a technique of identifying a relative positional relation between different images or connecting (or matching) the images.

Generally, in order to connect different images, a method of detecting feature points from two images, including a common space, and transforming and connecting the images through a transformation function (transformation matrix) that overlaps the detected feature points is used to minimize the error.

In addition, technical schemes (e.g., epipolar geometry, etc.) of using points existing in two images and matching each other (e.g., points in two different images and corresponding to the same point in space) have been introduced to grasp the positional relation between the two images although the images are not connected (matched).

However, there may exist a plurality of images, and there may be a case in which images that should be connected or mapped to each other among the images (e.g., images having the same space) are unknown. That is, it may be a case where the position and/or direction of each of the images is unknown.

For example, when images (e.g., 360-degree images) are photographed at a plurality of different positions in an indoor space, various services, such as navigation in an indoor space and the like, may be smoothly performed by specifying the positional relation of the images. However, it is unknown which images can be mapped to each other when the positions photographing the images are unknown.

In this case, whether the images can be mapped to each other should be determined for each combination of the images. However, such a task may consume a lot of resources and time. For example, when there are five different images, whether the images are mapped to each other can be determined by pairing a first image with second to fifth images, respectively, to find pairs of images that can be mapped to each other. For example, an image where most feature points common to those of the first image are found may be an image mapped to the first image. Because images are mapped to each other, there is an area where a common space is photographed, and the same feature points may be found in the area where the common space is photographed.

The topology relation between the images can be determined only when this task is performed for each image pair, and thereafter, mapping can be performed between images adjacent to each other. Although mapping in this specification may be matching (stitching) two images when the two images can be connected (matched or stitched), it may be defined as a meaning that includes identifying a relative positional relation between the two images when the images do not need to be connected (matched) like the images photographed at two different positions.

As described above, there is a problem in that as the number of images increases, the cost required for identifying images that can be mapped and specifying a positional relation between the identified images increases exponentially.

The above information disclosed in this Background section is only for understanding of the background of the inventive concepts, and, therefore, it may contain information that does not constitute prior art.

SUMMARY

It is an object of the present invention to provide a method and system capable of quickly and effectively determining mapping between a plurality of images.

Additional features of the inventive concepts will be set forth in the description which follows, and in part will be apparent from the description, or may be learned by practice of the inventive concepts.

To accomplish the above object, according to one aspect of the present invention, there is provided an automatic topology mapping processing method including the steps of: acquiring, by an automatic topology mapping processing system, a plurality of images, wherein at least two of the plurality of images include a common area in which a common space is captured; extracting, by the automatic topology mapping processing system, features of the images from each of the images through a feature extractor using a neural network; and determining, by the automatic topology mapping processing system, mapping images of the images based on the features extracted from each of the images.

The step of determining, by the automatic topology mapping processing system, mapping images of the images based on the features extracted from each of the images may include the steps of: constructing a database (DB) containing vectors corresponding to the features extracted from each of the images; performing a vector search using a vector set that is at least some of first vectors corresponding to first features extracted from a predetermined first image among the images from the constructed DB; and determining a second image extracted based on a result of the vector search as a mapping image of the first image.

The automatic topology mapping processing method may further include the step of mapping the first image and the second image determined as a mapping image of the first image.

The step of mapping the first image and the second image determined as a mapping image of the first image may include the steps of: determining first feature-corresponding positions on the first image corresponding to the first features extracted from the first image, respectively, and second feature-corresponding positions on the second image corresponding to second features extracted from the second image, respectively; and determining a relative positional relation between the first image and the second image based on the determined first feature-corresponding positions and the second feature-corresponding positions.

The neural network may be a network trained to output a transformation relation so that points corresponding to each other extracted from the overlapping common area of the divided images divided from a predetermined image to have an overlapping area may optimally match.

The images may be 360-degree images photographed at different positions in an indoor space.

According to another aspect of the present invention, there is provided an automatic topology mapping processing method including the steps of: acquiring, by an automatic topology mapping processing system, a plurality of images, wherein at least two of the plurality of images include a common area in which a common space is captured; extracting, by the automatic topology mapping processing system, features from each of the images; constructing DB containing vectors corresponding to the features extracted from each of the images; performing a vector search using a vector set that is at least some of first vectors corresponding to first features extracted from a predetermined first image among the images from the constructed DB; and determining a second image extracted based on a result of the vector search as a mapping image corresponding to the first image.

The method may be implemented by a computer program installed in a data processing device and stored in a recording medium.

According to another aspect of the present invention, there is provided an automatic topology mapping processing system including: a processor; and a memory for storing a program implemented by the processor, wherein the program acquires a plurality of images, wherein at least two of the plurality of images include a common area in which a common space is captured, extracts features of the images from each of the images through a feature extractor using a neural network, and determines mapping images of the images based on the features extracted from each of the images.

The processor may construct a database (DB) containing vectors corresponding to the features extracted from each of the images, perform a vector search using a vector set that is at least some of first vectors corresponding to first features extracted from a predetermined first image among the images from the constructed DB, and determine a second image extracted based on a result of the vector search as a mapping image of the first image.

The processor may determine first feature-corresponding positions on the first image corresponding to the first features extracted from the first image, respectively, and second feature-corresponding positions on the second image corresponding to second features extracted from the second image, respectively, and determine a relative positional relation between the first image and the second image based on the determined first feature-corresponding positions and the second feature-corresponding positions.

According to another aspect of the present invention, there is provided an automatic topology mapping processing system including: a processor; and a memory for storing a program implemented by the processor, wherein the program acquires a plurality of images, wherein at least two of the plurality of images include a common area in which a common space is captured, extracts features from each of the images, constructs DB containing vectors corresponding to the features extracted from each of the images, performs a vector search using a vector set that is at least some of first vectors corresponding to first features extracted from a predetermined first image among the images from the constructed DB, and determines a second image extracted based on a result of the vector search as a mapping image corresponding to the first image.

According to the present invention, features can be extracted within a short time by using image features extracted by a neural network, and images mapped to each other can be effectively identified in a vector search method by using the features when there is a plurality of images.

In addition, even after identifying images that can be mapped, effective mapping can be performed by using the features used in the neural network. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a flowchart illustrating a method of searching for a mapping image between images in an automatic topology mapping processing method according to an embodiment of the present invention.

FIG. 8 is a flowchart illustrating a method of mapping images in an automatic topology mapping processing method according to an embodiment of the present invention.

DETAILED DESCRIPTION

Figure 1A:
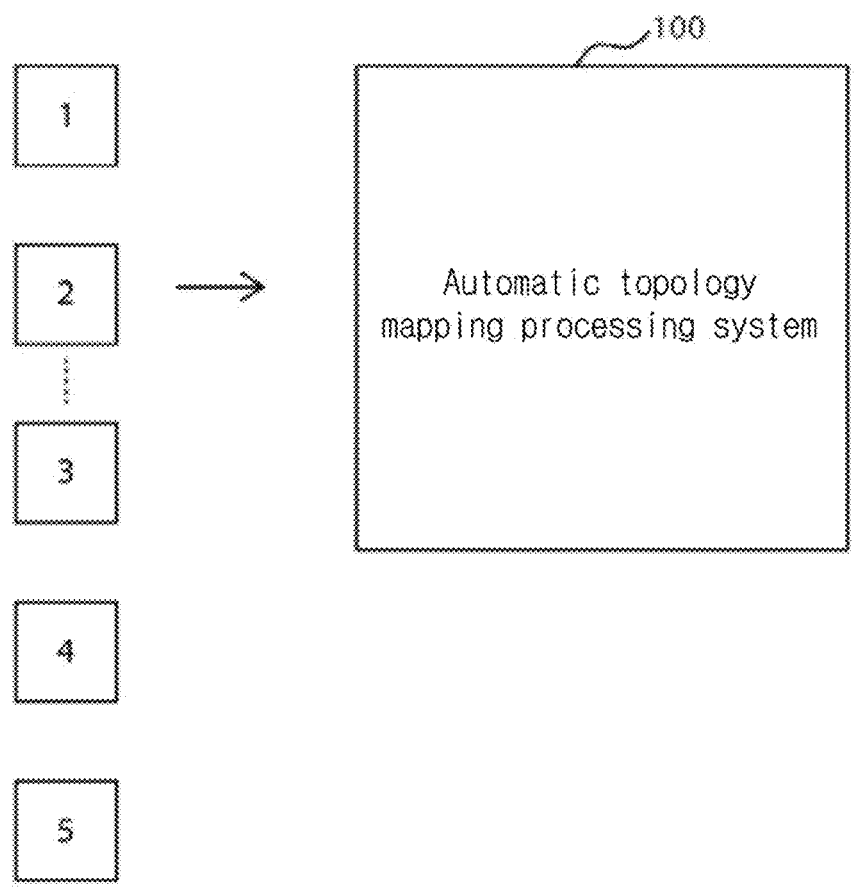
FIGS. 1A and 1B are views showing a schematic configuration for implementing an automatic topology mapping processing method according to an embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In addition, when any one component 'transmits' data to another component in this specification, this means that the component may directly transmit the data to another component or may transmit the data to another component through at least one other component.

Contrarily, when one component 'directly transmits' data to another component, it means that the data is transmitted from the component to another component without passing through other component.

Figure 1B:
Figure 2:
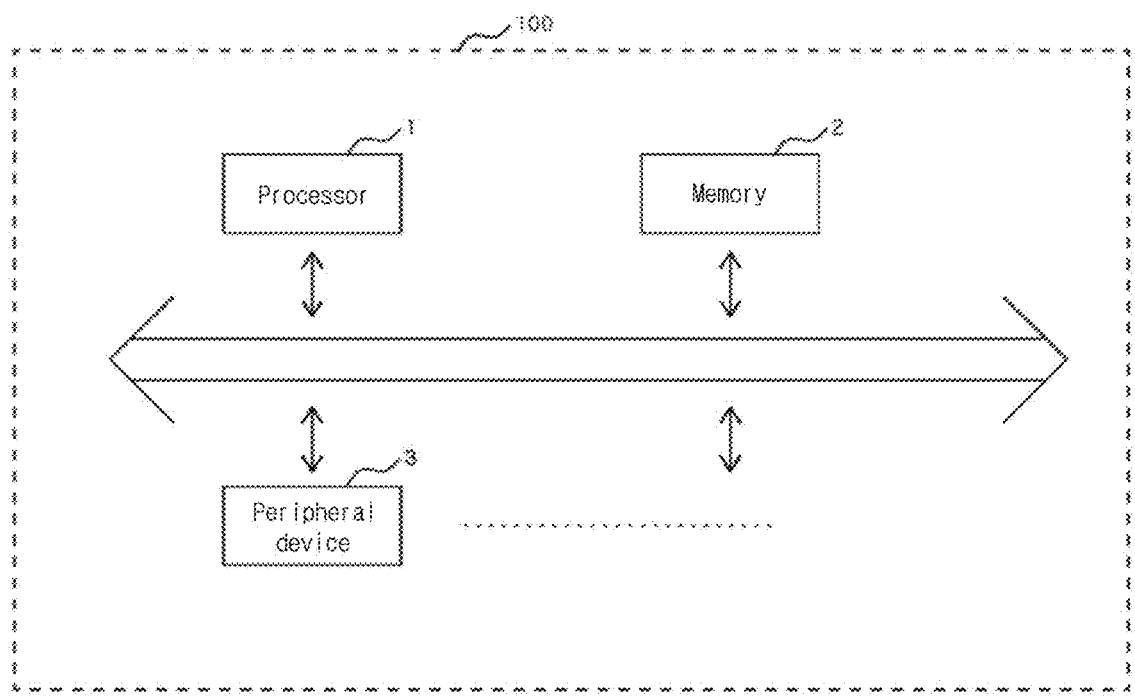
FIG. 2 is a view showing a schematic configuration of an automatic topology mapping processing system according to an embodiment of the present invention.

FIGS. 1A and 1B are views showing a schematic configuration for implementing an automatic topology mapping processing method according to an embodiment of the present invention. In addition, FIG. 2 is a view showing a schematic configuration of an automatic topology mapping processing system according to an embodiment of the present invention.

In order to implement the automatic topology mapping processing method according to the inventive concepts, there is provided an automatic topology mapping processing system 100.

The automatic topology mapping processing system 100 may include a memory 2 for storing a program for implementing the inventive concepts, and a processor 1 for executing the program stored in the memory 2.

Those skilled in the art may easily infer that the processor 1 may be diversely named as a central processing unit (CPU), mobile processor, or the like according to implementation examples of the automatic topology mapping processing system 100.

The memory 2 stores the program and may be implemented as any type of storage device that the processor may access to drive the program. In addition, according to hardware implementation, the memory 2 may be implemented as a plurality of storage devices, rather than any one storage device. In addition, the memory 2 may include a temporary storage device, as well as a main memory device. In addition, it may be implemented as a volatile memory or a non-volatile memory, and may be defined as a meaning that includes all types of information storage means implemented to store the program that is driven by the processor.

The automatic topology mapping processing system 100 may be implemented in various ways such as a web server, a computer, a mobile phone, a tablet computer, a TV, a set-top box, or the like according to embodiments, and may be defined as a meaning that includes any type of data processing device capable of performing the functions defined in this specification.

In addition, according to embodiments of the automatic topology mapping processing system 100, various peripheral devices 3 may be further provided. For example, those skilled in the art may easily infer that a keyboard, a monitor, a graphic card, a communication device, and the like may be further included in the automatic topology mapping processing system 100 as peripheral devices.

The automatic topology mapping processing system 100 according to the inventive concepts may identify images that can be mapped to each other, i.e., mapping images, among a plurality of images. In addition, according to embodiments, the automatic topology mapping processing system 100 may perform mapping between the identified mapping images.

The mapping images may mean images having the closest topology relation to each other. The closest topology relation may be a case of short distance, in addition to a case in which the images may directly move to each other spatially, and an example thereof is images that include the most common space.

In addition, although mapping may mean matching two images as described above, in the present invention, a case of identifying topologies of two images, i.e., the relative positional relation of the images, will be mainly described.

For example, as shown in FIG. 1A, the automatic topology mapping processing system 100 may receive a plurality of (e.g., five) images. Then, the automatic topology mapping processing system 100 may identify images that can be mapped to each other, i.e., mapping images, among the plurality of images, and perform mapping of the identified mapping images.

For example, in an embodiment of the present invention, the images may be omnidirectional images (360-degree images) photographed at different positions. In addition, the mapping images may be a pair of images that share a common space with each other most.

For example, as shown in FIG. 1B, images photographed at positions a, b, c, d and e may be image 1, image 2, image 3, image 4, and image 5, respectively.

In this case, although image 1, image 2, and image 3 include a lot of common space within a commonly photographed image, relatively more common space may be included in image 1 and image 2. Therefore, the mapping image of image 1 may be image 2.

Then, a mapping image should be searched for image 2, and at this point, image 1 for which a mapping image has already been determined may be excluded. Then, the mapping image of image 2 may be image 3.

In this way, the mapping image of image 3 may be image 4, and the mapping image of image 4 may be image 5.

Then, the automatic topology mapping processing system 100 may perform mapping on image 2, which is a mapping image, based on image 1. That is, the topology of image 2 with respect to image 1, i.e., the relative position of image 2 with respect to image 1, may be identified. In addition, the topology relation of all images may be specified by sequentially identifying the topology of image 3 with respect to image 2, the topology of image 4 with respect to image 3, and the topology of image 5 with respect to image 4.

As a result, in a conventional method, when there are a plurality of omnidirectional images and the exact position of each omnidirectional image is unknown, considerable time and resources may be required to identify the positional relation of the plurality of images.

For example, according to the conventional method, it is necessary to extract predetermined feature points from all images and identify how many common feature points exist in each image pair using the extracted feature points. In addition, an image pair having the most common feature points may be identified as images mapping to each other, and mapping, i.e., a relative positional relation, may be determined according to the positions of the common feature points. When matching is needed, a transformation matrix for overlapping the common feature points with minimum error is determined, and two images may be connected (matched) by transforming any one image using the transformation matrix.

However, for the feature points used in the conventional method, a considerable amount of time and operation is consumed to extract the feature points. In addition, it needs to perform an operation of comparing feature points for all image pairs in order to identify the mapping images, and as the number of feature points in the images increases, this operation takes a considerable amount of time.

However, as described above, according to the inventive concepts, it is possible to quickly, accurately and automatically search for mapping images from a plurality of images and perform mapping on the searched mapping images.

To solve this problem, the automatic topology mapping processing system 100 according to the inventive concepts may use neural network features.

The neural network features defined in this specification may mean all or some features selected from a feature map of a predetermined layer of a neural network trained to achieve a predetermined purpose.

These features are used in a neural network (e.g., a convolutional neural network) trained to achieve a specific purpose, and may be information derived by the trained neural network when the neural network is trained to achieve the specific purpose.

Figure 4A:
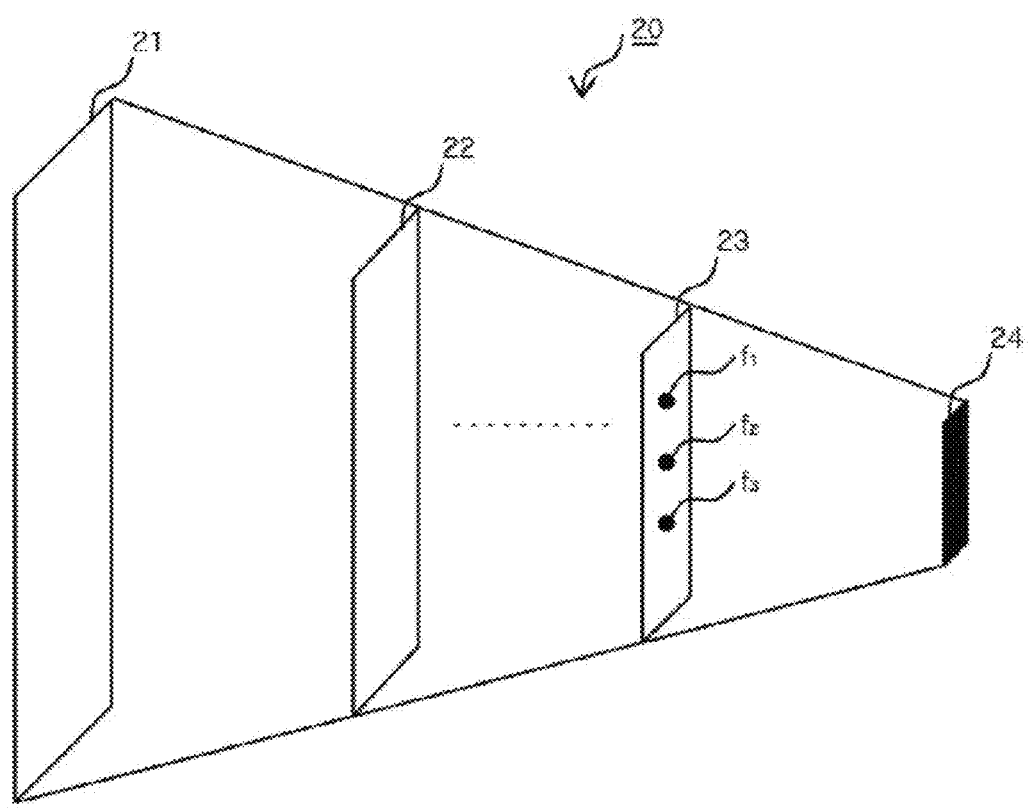
FIGS. 4A and 4B are views showing the concept of using features of a neural network for an automatic topology mapping processing method according to an embodiment of the present invention.

For example, a neural network 20 as shown in FIG. 4A may exist, and the neural network may be a convolutional neural network (CNN).

In this case, a plurality of layers 21, 22, 23 and 24 may be included in the neural network 20, and there may be an input layer 21, an output layer 24, and a plurality of hidden layers 22 and 23. The output layer 24 may be a layer fully connected to a previous layer, and the automatic topology mapping processing system 100 according to the inventive concepts may select the neural network features f1, f2 and f3 from the output layer 24 or a layer (e.g., 23) including an arbitrary feature map before the fully connected layer.

The neural network features f1, f2 and f3 used by the automatic topology mapping processing system 100 may be all the features included in the feature map of a corresponding layer or may be some features selected among the features.

The automatic topology mapping processing system 100 may use these features, instead of conventional handcraft feature points, such as Scale-Invariant Feature Transform (SIFT), Speeded Up Robust Features (SURF), or Oriented FAST and Rotated BRIEF (ORB), to identify mapping images or perform mapping between the mapping images. That is, the features used in the convolutional neural network may be used instead of the conventional handcraft features.

It is desirable that features of an image have the same characteristics regardless of a scale or orientation, and in the convolutional neural network, a layer before the output layer 23 has these characteristics through a plurality of nonlinear convolutional functions and/or a pooling function. Moreover, the conventional handcraft features are extracted only from a characteristic position defined by a person, such as an edge or the like in an image, and in most cases, they are extracted only from a location where an edge exists (e.g., a location where an edge is bent).

However, it is advantageous in that the neural network 20 may be trained so that the neural network features may be found in a flat area of an image, not in such a location. In addition, the handcraft features are not detected in some cases although feature points should be detected according to image distortion or image quality, whereas since the neural network features are much more robust to image distortion, there may be improvement of accuracy even in feature extraction.

The neural network 20 itself may be a feature extractor. For example, it may be designed such that when features are selected from the output layer 24 or a fully-connected immediately before layer 23, the output layer 24 outputs the selected features f1, f2, f3 themselves of the immediately before layer 23, and in this case, the neural network 20 itself may work as a feature extractor.

Alternatively, the neural network 20 may be trained to achieve a separate unique purpose (e.g., classification, object detection, etc.). Even in this case, consistent features may be selected from a predetermined layer and used as neural network features at all times. For example, in the case of FIG. 4A, a combination of remaining layers excluding the output layer 24 may work as a feature extractor.

According to an embodiment of the present invention, the neural network 20 may be a neural network that is trained to derive an optimal transformation relation (e.g., minimizing the error) so that points corresponding to each other, which are extracted from the overlapping common area of the divided images, may match. The divided images can be acquired by dividing any one image to have an overlapping area.

Figure 4B:
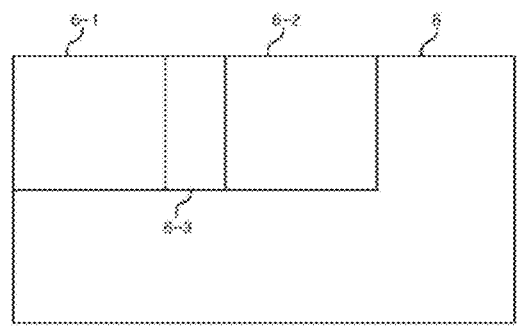
Figure 4B:
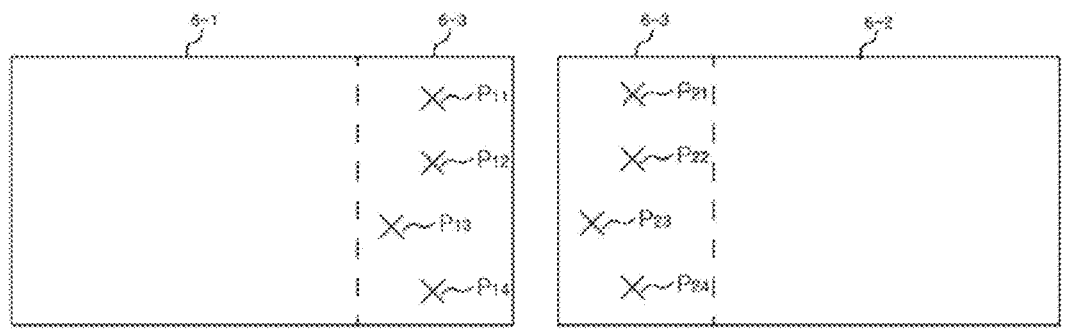

For example, as shown in FIG. 4B, all or part of a predetermined image 6 may be divided to have an overlapping common area 6-3. Then, a predetermined number of points (e.g., P11 to P14 and P21 to P24) corresponding to each other may be extracted from each of the divided images 6-1 and 6-2.

Then, a neural network trained to transform the points P11 to P14 extracted from a first divided image 6-1 to the points P21 to P24 extracted from a second divided image 6-2 with minimum error (e.g., determine parameters of a transformation matrix) may be implemented as the neural network 20.

At this point, the points (e.g., P11 to P14 and P21 to P24) may be arbitrarily selected points or feature points extracted from the common area of the images in a predetermined method.

In any case, in order to achieve a predetermined purpose, all or part of a well-trained neural network 20 may be used as a feature extractor that selects and extracts features from an image.

In addition, using such a feature extractor, the same feature may be extracted from the common area included in different images received by the automatic topology mapping processing system 100. Accordingly, an image in which the same features (features corresponding to each other) exist the most in any one image may be determined as a mapping image.

According to the inventive concepts, since neural network features are expressed as a vector, a vector search engine capable of high-speed operation may be used, instead of comparing features for all image pairs to search for a mapping image of a specific image as shown in the prior art, to determine the positional relation more quickly.

Techniques of searching large-scale vectors in a speedy way have been widely publicized in recent days.

The vector search engine may be an engine constructed to find vectors most similar (closest) to an input vector (or vector set) in a speedy way. All vectors are indexed and stored in a database (DB), and the vector search engine may be designed to output a vector (or vector set) closest to an input vector (or vector set).

Such a vector search engine may be constructed using known vector search techniques, such as Facebook AI Similarity Search (Faiss) or the like. Such a vector search engine has an effect of enabling large-scale high-speed computation when it is performed based on a graphical processing unit (GPU).

The vector search engine according to the inventive concepts may receive a set of features extracted from a target image (e.g., image 1) and output a most similar (closest) vector or vector set in response thereto. In addition, a mapping image of the target image may be determined in a speedy way by determining which image is the source of the vector or vector set.

For example, all the features extracted from the first image may be input into the vector search engine. The vector search engine may output a vector having the shortest distance to each of the features input from the vector DB or a distance to a vector having the shortest distance. This task may be performed for each image.

For example, when it is assumed that there are five images and ten features are extracted from each of the images, fifty vectors may be indexed and stored in the vector DB. In addition, information on each source image may be stored together.

Then, the vector search engine may receive ten vectors extracted from the first image. In addition, the vector search engine may output ten vectors extracted from the second image having the shortest distance among each of the ten vectors or a sum of the distances. When this method is performed on the vectors extracted from the third image, the vectors extracted from the fourth image, and the vectors extracted from the fifth image, an image including feature sets most similar to the input vector set may be searched in a speedy way. In addition, the searched image may be determined as the mapping image of the first image.

According to embodiments, the vector search engine may output remaining vectors (forty vectors) excluding ten vectors extracted from the first image for each of the ten vectors output from the first image in order of vectors having the shortest distance. For example, when a list of ten vectors is output, the automatic topology mapping processing system 100 may analyze the vector list and output a mapping image.

The result output by the vector search engine or a method thereof may be diverse. However, in any case, according to the inventive concepts, features may be extracted from each of the input images, and these features may be input into a DB constructed to enable vector search, and the vector search engine may perform a function of outputting the most similar (short distance) vector or vector set when it receives a vector or a vector set. It is possible to search for a mapping image in a speedy way through this function.

According to embodiments, all the features of a target image, i.e., an image (e.g., the first image) for which a mapping image is to be searched, may not be input, but some of the features may be input into the vector search engine. For example, only the features corresponding to a predefined area in the image may be input into the vector search engine to identify the positional relation. Since the predefined area may be generally an area adjacent to the left, right, upper and lower edges, rather than the center portion of the image, an outer area of the image may be arbitrarily set, and the features corresponding to the set area may be selectively used as an input for vector search. Of course, only the features corresponding to the outer area or all the features may be input into the vector DB.

In addition, the neural network feature itself according to the inventive concepts does not specify the position in an extracted image. Accordingly, mapping may be performed only when the position (point) in the original image corresponding to the neural network feature is specified. Therefore, a scheme for specifying a position in an original image corresponding to a neural network feature is required, and this will be described below with reference to FIG. 6.

Figure 3:
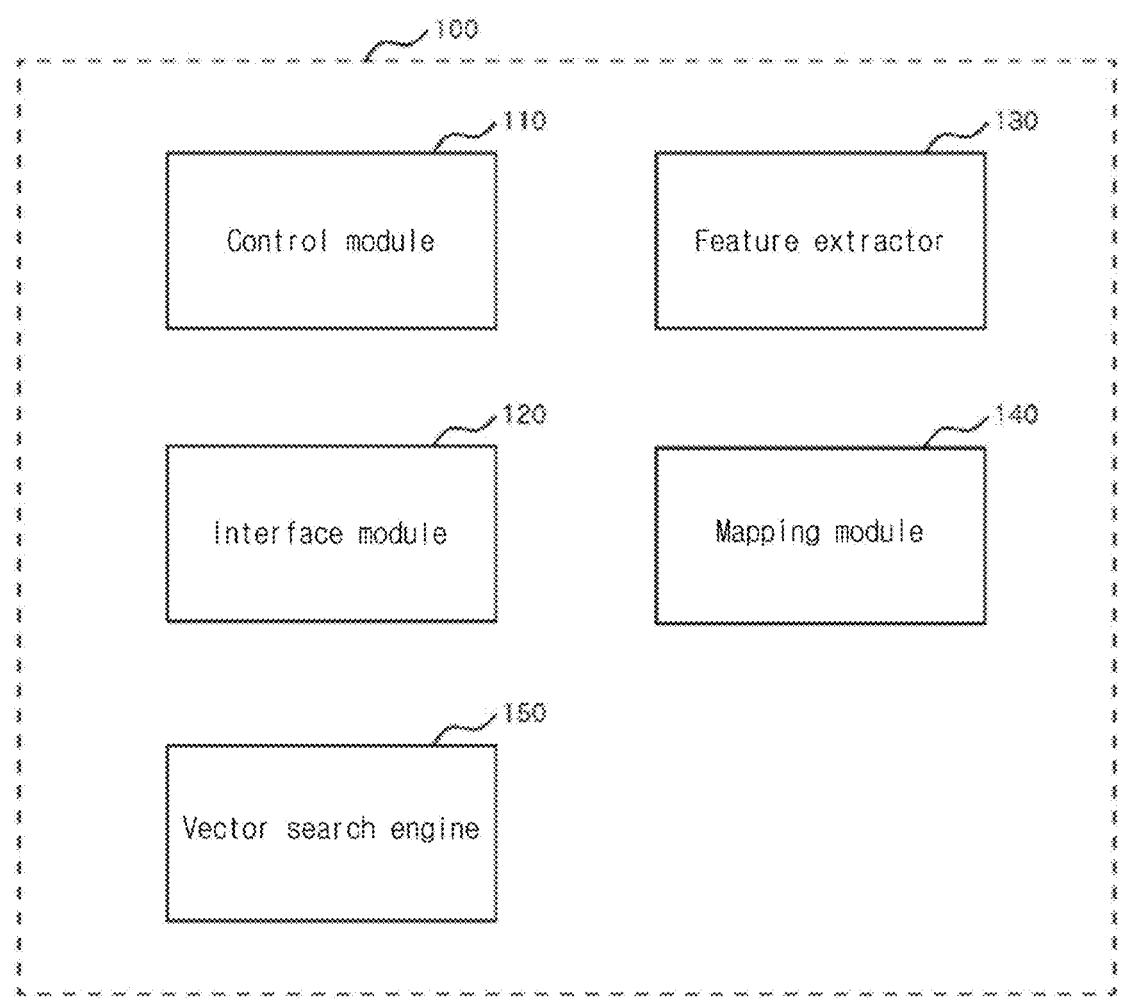
FIG. 3 is a view schematically showing a logical configuration of an automatic topology mapping processing system according to an embodiment of the present invention.

The automatic topology mapping processing system 100 for implementing the scheme as described above may be defined as a functional or logical configuration as shown in FIG. 3.

FIG. 3 is a view schematically showing a logical configuration of an automatic topology mapping processing system according to an embodiment of the present invention.

Referring to FIG. 3, the automatic topology mapping processing system 100 according to the inventive concepts includes a control module 110, an interface module 120, and a feature extractor 130. The automatic topology mapping processing system 100 may further include a mapping module 140 and/or a vector search engine 150.

The automatic topology mapping processing system 100 may mean a logical configuration provided with hardware resources and/or software needed to implement the inventive concepts, and does not necessarily mean a physical component or a device. That is, the automatic topology mapping processing system 100 may mean a logical combination of hardware and/or software provided to implement the inventive concepts, and may be implemented as a set of logical components if needed by being installed in the devices separated from each other and performing their functions to implement the inventive concepts. In addition, the automatic topology mapping processing system 100 may mean a set of components separately implemented for each function or role for implementing the inventive concepts. For example, the control module 110, the interface module 120, the feature extractor 130, the mapping module 140 and/or the vector search engine 150 may be located in different physical devices, or may be located in the same physical device. In addition, according to implementation examples, combinations of software and/or hardware configuring each of the control module 110, the interface module 120, the feature extractor 130, the mapping module 140 and/or the vector search engine 150 may also be located in different physical devices, and components located in different physical devices may be organically combined with each other to implement each of the modules.

In addition, in this specification, a module may mean a functional or structural combination of hardware for performing the inventive concepts and software for driving the hardware. For example, those skilled in the art may easily infer that the module may mean a predetermined code and a logical unit of hardware resources for executing the predetermined code, and does not necessarily mean a physically connected code or a single type of hardware.

The control module 110 may control other components included in the automatic topology mapping processing system 100 (e.g., the interface module 120, the feature extractor 130, the mapping module 140, and/or the vector search engine 150) to implement the inventive concepts.

The interface module 120 may receive a plurality of images from the outside. The plurality of images may be images photographed at different positions. According to an example, although the plurality of images may be 360-degree images photographed in a indoor space, it is not limited thereto.

Among the plurality of images, there may be images obtained by photographing a common space at different positions, and two images including the common space, i.e., a common area, may be defined as being in a mapping relation. Among the images, an image including the most common area may be defined as a mapping image, and this may be defined as images having the most corresponding features.

The feature extractor 130 may extract features defined according to the inventive concepts, i.e., neural network features, from each of the plurality of images input through the interface module 120.

As described above, the neural network features may be features of an image specified before the output layer in a predetermined neural network (e.g., CNN). The feature extractor 130 may be the neural network 20 itself as shown in FIG. 4A, or may mean the configuration from the input layer 21 to a predetermined layer (e.g., 23) before the output layer 24 in the neural network. All or some of the features included in the feature map defined by the layer 23 may be neural network features.

Although the neural network 20 may be trained for the purposes (e.g., classification, detection, etc.) other than the purpose of extracting neural network features, as described above, it may be a neural network designed to match two images with minimum error or a neural network trained for the purpose of extracting neural network features.

For example, in the latter case, it may be trained to output handcraft feature points capable of expressing features of an image well and/or a position arbitrarily set by a user, and in this case, the neural network 20 itself may be the feature extractor 130.

The position arbitrarily set by a user may be set as a position set by the user (e.g., the center position of an object) in a predetermined object (e.g., a wall, a door, etc.). In addition, the position set by the user may be set in a flat area, i.e., in a flat image area where no edges or corners exist, unlike the conventional handcraft feature points. In this case, unlike the conventional handcraft feature points, a feature may be defined even in a flat image area that is not extracted as a feature point, and when this feature is used, more accurate determination and mapping of mapping images can be performed.

Figure 5:
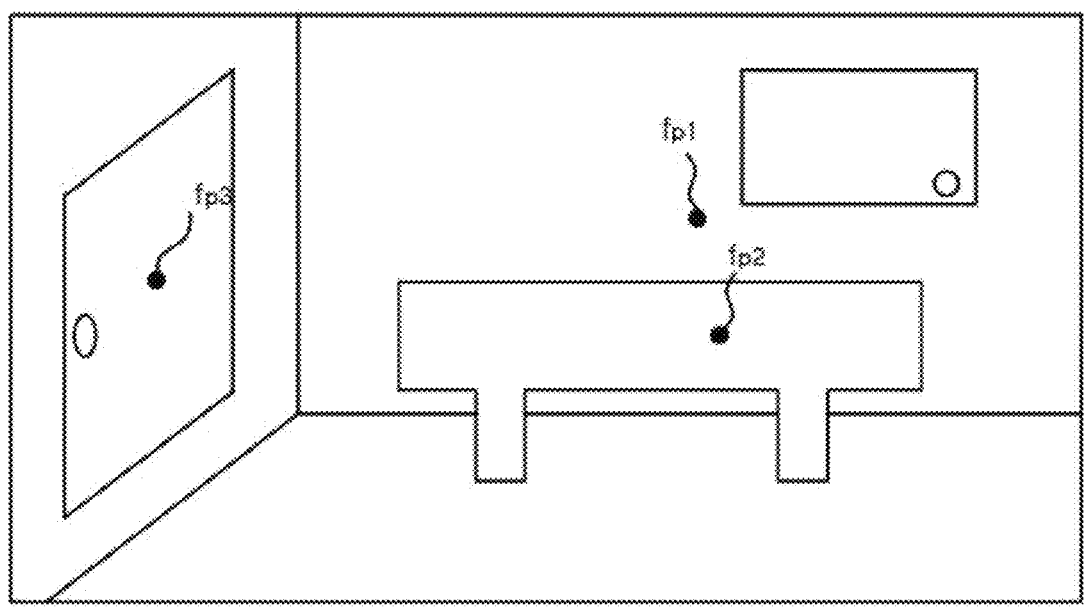
FIG. 5 is a view showing the advantages of using neural network features according to an embodiment of the present invention.

FIG. 5 is a view showing the advantages of using neural network features according to an embodiment of the present invention.

As shown in FIG. 5, the feature extractor 130 may be trained so that an arbitrary position in a predetermined object (e.g., a wall, a door, a table) may be specified as a feature point (fp1, fp2, fp3).

In addition, as shown in FIG. 5, the arbitrary position may be generally set in a flat image area, such as a predetermined position for each object (e.g., the center of a wall, the center of a table, the center of a door, etc.).

Of course, the feature extractor 130 may be trained to extract features corresponding to handcraft feature points, such as a conventional edge, bent corner, and the like.

For example, a user may annotate handcraft feature points and set positions of a flat area set by the user on a plurality of images for each object, and train the neural network 20 using the annotation as learning data. In this case, features corresponding to the feature points fp1, p2 and fp3 may be extracted, and the feature points themselves may be output.

In any case, when the neural network features are used, a position that is not extracted with a conventional handcraft feature may be used as a feature as shown in FIG. 5, and therefore, it may have an advantageous effect in defining an image feature or mapping an image.

On the other hand, although the neural network feature is characteristic information of an image determined through a plurality of convolutions and/or pooling in order to output an object desired by the neural network 20, the neural network feature itself may not represent a specific position in the original image.

Accordingly, even when a neural network feature is extracted, a position in the original image corresponding to the neural network feature, i.e., a feature position, needs to be specified. This is since that mapping of an image may be performed only when such a feature position is specified.

The scheme for specifying a feature position of a neural network feature like this will be described with reference to FIG. 6.

Figure 6:
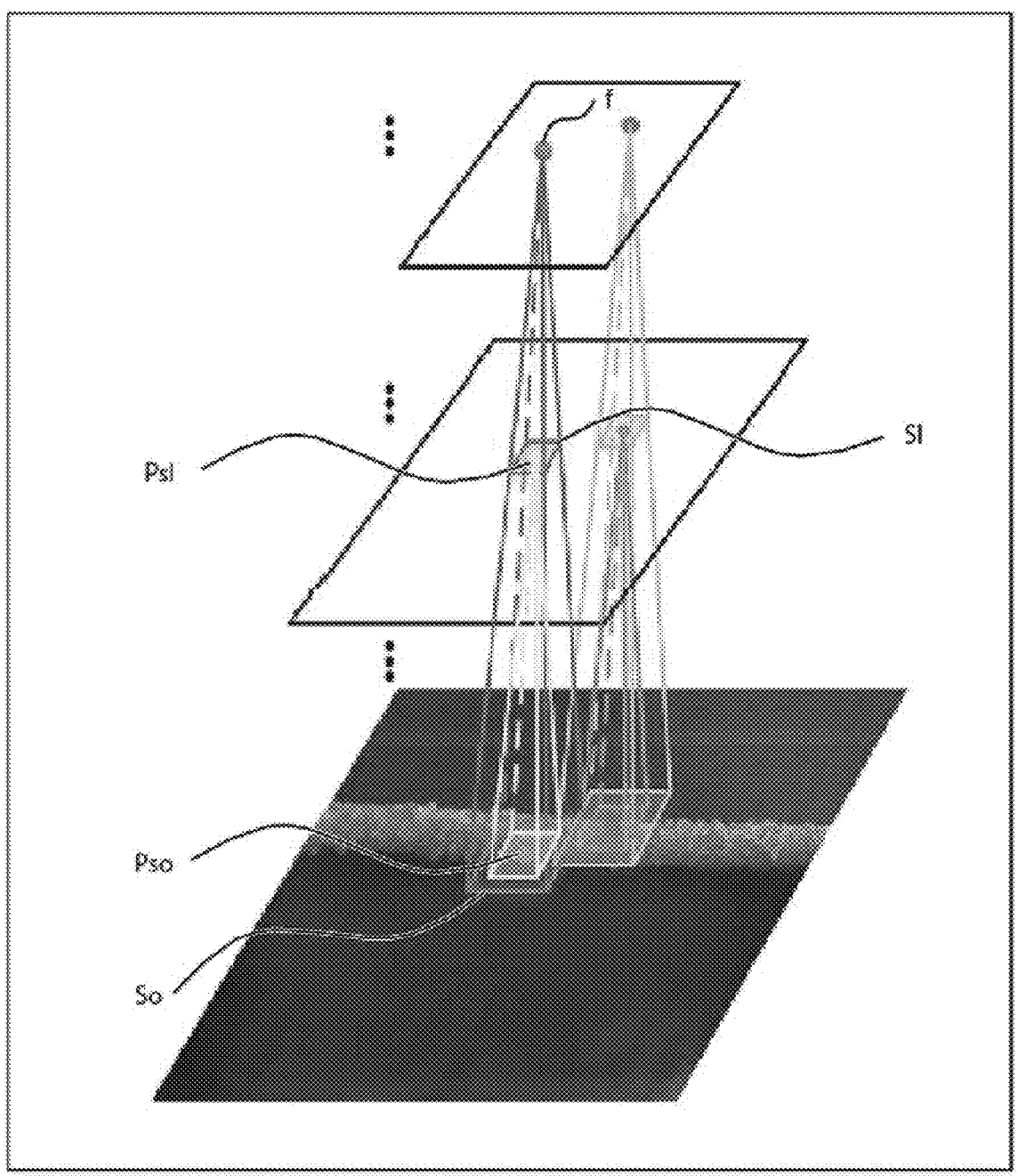
FIG. 6 is a view showing feature positions corresponding to neural network features according to an embodiment of the present invention.

FIG. 6 is a view showing feature positions corresponding to neural network features according to an embodiment of the present invention.

As shown in FIG. 6, a neural network feature f may be extracted from a predetermined layer. In this case, the neural network feature f corresponds to a predetermined corresponding area Sl in a predetermined layer 1, and pixel information included in this corresponding area Sl may be mapped to the neural network feature f by a predefined convolution and pooling function.

At this time, a predetermined position (e.g., the center or a specific vertex) in the corresponding area Sl of the neural network feature fin layer 1 may be defined as the corresponding position PS1 of the neural network feature f in layer 1.

Then, in the same manner, a corresponding area So in the original image corresponding to the corresponding position PS1 in layer 1 may be specified by the convolution and pooling relation between the original image and layer 1, and a predetermined position (e.g., the center) in the corresponding area So may be specified as a corresponding position, i.e., a feature position, in the original image of the neural network feature f.

When a feature position is determined for each neural network feature in this way, each feature position may be a feature point for image mapping.

Then, the mapping module 140 may perform image mapping using feature positions corresponding to each other between mapping images.

In the case of mapping, which specifies a relative positional relation between two images, image mapping between two images may be performed using points corresponding to each other in each of the two images. At this point, the points corresponding to each other may be feature points of neural network features extracted from each of the two images, and feature points corresponding to each other may be easily searched for through a vector search engine.

The scheme of specifying the relative positional relation between two images when the points corresponding to each other (representing the same position in space) exist in different images has already been publicized.

For example, it can be easily inferred by those skilled in the art that a relative positional relation may be determined using epipolar geometry. In addition, various methods may be used.

According to another embodiment, when mapping between two images, i.e., mapping images, is matching the two images, specifying a transformation matrix for matching the two images may be a process of performing the mapping.

It is widely known that in order to specify such a transformation matrix, three pairs of features corresponding to each other are extracted and the transformation matrix may be defined to transform the extracted three pairs of features. In addition, these three pairs of features may be searched for to transform all features with minimum error, and of course, an algorithm such as RANSAC or the like may be used.

As described above, the vector search engine 150 may input vectors corresponding to the features of the images extracted by the feature extractor 130 into the DB, and receive a vector set corresponding to the feature set extracted from the target image (e.g., the first image). Then, a vector search result may be output as described above.

Then, the control module 110 may determine an image existing in a positional relation adjacent to the target image based on the vector search result.

FIG. 7 is a flowchart illustrating a method of searching for a mapping image between images in an automatic topology mapping processing method according to an embodiment of the present invention.

Referring to FIG. 7, the automatic topology mapping processing system 100 according to the inventive concepts may extract neural network features from each of a plurality of images (S100). Then, the features may be constructed as a vector DB, and vector search may be performed on a vector set (feature set) extracted from a target image (S110, S120).

Then, a mapping image of the target image may be determined based on the vector search result (S130), and the mapping image of each image may be determined by performing the same task for all images (S140).

FIG. 8 is a flowchart illustrating a method of mapping images in an automatic topology mapping processing method according to an embodiment of the present invention.

Referring to FIG. 8, in order to map a first image and a second image determined as mapping images to each other, the automatic topology mapping processing system 100 according to the inventive concepts may specify feature positions corresponding to the features extracted from the first image (S200). To this end, a method as shown in FIG. 6 may be used.

In addition, feature positions corresponding to the features extracted from the second image may be specified (S210).

Then, the automatic topology mapping processing system 100 may determine a relative positional relation through the Epipolar Geometry algorithm based on the feature positions of each image, or determine a transformation matrix for image connection in a predetermined manner (e.g., RANSAC algorithm) (S220).

The automatic topology mapping processing method according to an embodiment of the present invention may be implemented as a computer-readable code in a computer-readable recording medium. The computer-readable recording medium includes all types of recording devices for storing data that can be read by a computer system. Examples of the computer-readable recording medium include ROM, RAM, CD-ROM, magnetic tape, hard disk, floppy disk, optical data storage device and the like. In addition, the computer-readable recording medium may be distributed in computer systems connected through a network to store and execute computer-readable codes in a distributed manner. In addition, functional programs, codes, and code segments for implementing the present invention may be easily inferred by programmers in the art.

Although the present invention has been described with reference to an embodiment shown in the drawings, this is merely exemplary, and those skilled in the art will understand that various modifications and equivalent other embodiments are possible therefrom. Accordingly, the true protection scope of the present invention should be determined by the spirit of the appended claims.

The present invention may be used in an automatic topology mapping processing method based on omnidirectional image information and a system thereof.

The invention claimed is:

1. An automatic topology mapping processing method comprising:
    acquiring, by an automatic topology mapping processing system, a plurality of images, wherein at least two of the plurality of images include a common area in which a common space is captured;
    extracting, by the automatic topology mapping processing system, features of the images from each of the images through a feature extractor using a neural network; and
    determining, by the automatic topology mapping processing system, mapping images of the images based on the features extracted from each of the images;
    wherein the determining, by the automatic topology mapping processing system, mapping images of the images based on the features extracted from each of the images comprises:
    constructing a database (DB) containing vectors representing the features extracted from each of the images;
    performing a vector search using a vector set that includes at least some of first vectors corresponding to first features extracted from a predetermined first image among the images from the constructed DB, wherein only the features corresponding to a predefined area in the image are input into the vector search to identify a positional relation of the plurality of images, and acquiring a closest vector set to the vector set; and
    determining a second image corresponding to the closest vector set as a mapping image of the first image.

2. The method according to claim 1, further comprising mapping the first image and the second image determined as a mapping image of the first image.

3. The method according to claim 2, wherein the mapping the first image and the second image determined as a mapping image of the first image comprises: determining first feature-corresponding positions on the first image corresponding to the first features extracted from the first image, respectively, and second feature-corresponding positions on the second image corresponding to second features extracted from the second image, respectively; and
    determining a relative positional relation between the first image and the second image based on the determined first feature-corresponding positions and the second feature-corresponding positions.

4. The method according to claim 1, wherein the neural network is a network trained to output a transformation relation so that points corresponding to each other extracted from an overlapping common area of divided images divided from a predetermined image to have an overlapping area optimally match.

5. The method according to claim 1, wherein the images are 360-degree images photographed at different positions in an indoor space.

6. A non-transitory computer readable medium having stored thereon software instructions that, when executed by a processor, cause the processor to generate control signals to perform the method according to claim 1.

7. An automatic topology mapping processing system comprising:
    a processor; and
    a memory for storing a program implemented by the processor,
    wherein:
    the program acquires a plurality of images; and
    at least two of the plurality of images include a common area in which a common space is captured, extracts features of the images from each of the images through a feature extractor using a neural network, and determines mapping images of the images based on the features extracted from each of the images,
    wherein the program constructs a database (DB) containing vectors corresponding to the features extracted from each of the images, performs a vector search using a vector set that includes at least some of first vectors corresponding to first features extracted from a predetermined first image among the images from the constructed DB, wherein only the features corresponding to a predefined area in the image are input into the vector search to identify a positional relation of the plurality of images, and acquiring a closest vector set closest to the vector set; and
    determines a second image corresponding to the closest vector set as a mapping image of the first image.

8. The system according to claim 7, wherein the program constructs the database (DB) containing vectors corresponding to the features extracted from each of the images, performs the vector search using a vector set that is at least some of first vectors corresponding to first features extracted from the predetermined first image among the images from the constructed DB, and determines the second image extracted based on a result of the vector search as a mapping image of the first image.

9. The system according to claim 8, wherein the program determines first feature-corresponding positions on the first image corresponding to the first features extracted from the first image, respectively, and second feature-corresponding positions on the second image corresponding to second features extracted from the second image, respectively, and determines a relative positional relation between the first image and the second image based on the determined first feature-corresponding positions and the second feature-corresponding positions.

\* \* \* \* \*